Patented Sept. 6, 1927.

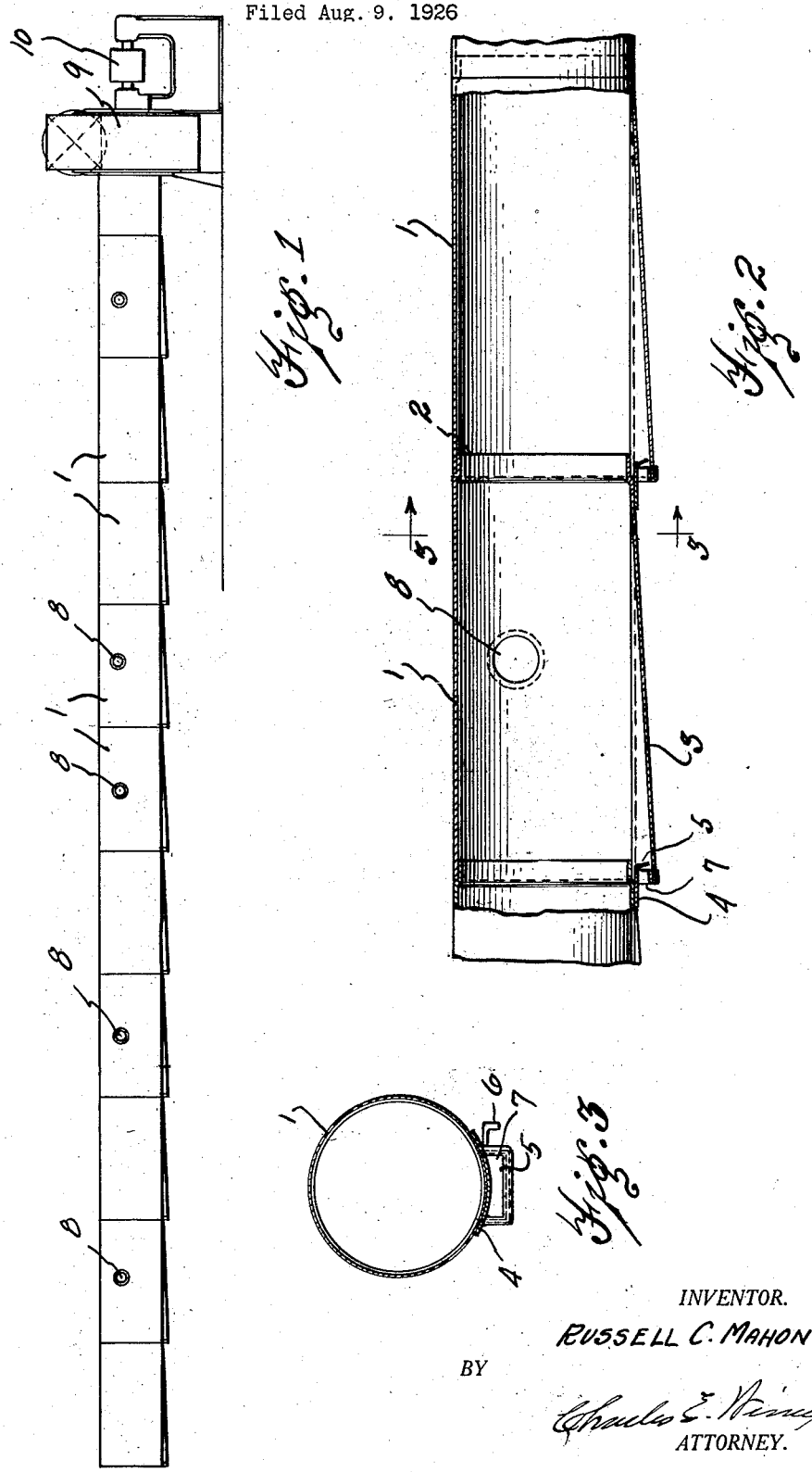

1,641,181

UNITED STATES PATENT OFFICE.

RUSSELL C. MAHON, OF DETROIT, MICHIGAN.

PNEUMATIC CONVEYER.

Application filed August 9, 1926. Serial No. 128,094.

This invention relates to pneumatic conveyers and the object of the invention is to provide a pneumatic conveyer conduit of uniform diameter throughout provided with valve controlled apertures in the bottom by means of which the material passing through the conveyer may be prevented from accumulating in the bottom of the conveyer conduit.

In the usual type of conveyer conduit utilized in connection with an exhaust fan the conduit is designed to maintain velocity which is accomplished by reducing the sections in diameter in proportion to the distance of the section from the fan and the reduced sections are limited as to the amount of material that may be discharged thereinto. With this former type of conveyer conduit if one or more inlets for material are added to the conduit it is necessary to reconstruct the entire conveyer to accommodate the additional inlets. In other words the systems now in use are not adaptable to a rearrangement of inlets which discharge thereinto. The primary object of my invention therefore is to provide a conveyer construction which will readily lend itself to rearrangement of the inlets discharging thereinto, addition of new inlets, or the elimination of some of the inlets discharging into the conveyer without rearrangement or redesigning of the conveyer conduit.

A further object of the invention is to provide a pneumatic conveyer into which inlets may discharge at any point and which will operate efficiently even when several inlets discharge into the same section of the conveyer. This is accomplished by providing openings in the bottom of the conveyer through which additional air may flow to prevent accumulation of material in the bottom of the conveyer conduit.

These objects and the several novel features of the invention are hereinafter more fully described and claimed and the preferred form of construction by which these objects are attained is shown in the accompanying drawings in which—

Fig. 1 is a view of a pneumatic conveyer embodying my invention.

Fig. 2 is an enlarged longitudinal section through a portion of the conveyer conduit.

Fig. 3 is a section taken on line 3—3 of Fig. 2.

As shown in Figs. 1 and 2 the conveyer conduit is built up from a series of sections 1. Each section is provided with a flange 2 of decreased diameter at one end which is adapted to fit within the succeeding section. Each section at the bottom is provided with a sloping depression 3 which starts adjacent the flange 2 of the section and continues increasingly deeper toward the opposite end of the section. A supporting arcuate flange 4 is provided as shown in Figs. 2 and 3 which supports the end of the adjacent section above the depression 3 in the bottom of the section. This supporting flange provides a support for the valve or damper 5 which is hinged to the said flange and the damper 5 may be turned by means of a handle 6 extending outwardly from the side of the conduit and is utilized for controlling the opening 7 at the end of the depression 3. The conduit when assembled provides a pneumatic conveyer for conveying material such as shavings, cotton waste or like material. For this use the conduit is set up in a factory and discharge conduits from the machines discharge into the conveyer conduit through the apertures 8 shown in Figs. 1 and 2. The conduit is connected to an exhaust fan housing 9 having a discharge conduit shown in dotted lines in Fig. 1 and containing an exhaust fan adapted to be driven by the pulley 10. This exhaust fan preferably discharges into a dust collector adapted to separate the material from the air. In the usual conduit of this type the material tends to accumulate at different points in the bottom of the conduit particularly where the discharge pipes from several machines enter the conduit in close proximity thus decreasing the efficiency of the conveyer system.

With my device if the material tends to accumulate in any particular section of the conduit the valve 5 in that section is opened allowing air to be drawn inwardly by the exhaust fan along the bottom of the conduit thus fluffing the material and withdrawing it from the bottom of the conduit and preventing accumulation of the material in the conduit. With this arrangement the valves 5 throughout the length of the conduit may be adjusted so that the material cannot accumulate at any point in the conduit even when two or three inlets discharge into one section of the conduit. This allows the machines to be arranged in a factory for the most convenient floor arrangement and these machines may discharge material into the conduit at any point.

In the ordinary conveyer in which reduced sections are utilized to maintain velocity it is necessary to arrange the machines in the factory so that they discharge into the conduit at specific points in order to prevent clogging of the conduit by the material and when a new machine is added to the equipment it is often necessary to rearrange all the machines in the factory so that they discharge into the conduit in a manner to prevent accumulation of the material therein.

By opening all of the valves 5 in my conveyer the material passing through the conduit is lifted from section to section by the air flowing into the bottom of each section. While I have shown a round conduit it will be readily understood that any shape of conduit may be utilized as long as the means for admitting air is provided in the bottom of each section.

In ordinary pneumatic conveyer constructions the sections of the main conduit decrease in size as the various leads are taken off in order to maintain velocity. In this application the conveyer is not designed to maintain velocity in the main conduit but to maintain suction or pressure, and the deposition of material caused by lack of velocity, is taken care of by providing openings in the bottom of the conduit through which air is drawn at a high velocity.

From the foregoing description it becomes evident that the device is very simple and efficient in operation, will not easily get out of order, does not add materially to the cost of the sections and provides a device which accomplishes the objects described.

Having thus fully described my invention, its utility and mode of operation, what I claim and desired to secure by Letters Patent of the United States is—

1. In a pneumatic conveyer, a series of sections fitting together in end to end relation to form a conduit, each section being provided with a depression in the bottom beginning at one end of the section and sloping longitudinally of the section toward the opposite end of the section, the depression being open to atmosphere at the end, and a manually operable valve for controlling the said opening.

2. In a pneumatic conveyer, a series of sections fitting together in end to end relation to form a conduit, each section being provided with a sloping depression in the bottom beginning at one end of the section and terminating in an opening beneath the opposite end of the section, manually operated means for controlling flow of air through the opening in each section independently, and an exhaust fan for withdrawing air from the conduit.

3. In a pneumatic conveyer, a series of sections fitting together in end to end relation to form a conduit, each section being provided with a sloping depression beginning at one end of the section and terminating in an opening beneath the opposite end of the section, means for controlling flow of air through the openings, and an exhaust fan for withdrawing air from the conduit.

4. In a pneumatic conveyer, a series of sections fitting together to form a conduit, each section being provided with a sloping depression beginning at one end of the section and terminating in an opening beneath the opposite end of the section, and means for controlling flow of air through the opening.

5. In a pneumatic conveyer, a series of sections fitting together to form a conduit, each section being provided with a sloping depression in the bottom extending longitudinally of the section and opening beneath the section adjacent one end thereof, and means for controlling flow of air through the opening.

6. In a pneumatic conveyer, a series of sections fitting together to form a conduit, each section being provided with a sloping depression in the bottom extending longitudinally of the section and opening beneath the end of the section, and a valve for controlling flow of air through the opening.

7. In a pneumatic conveyer, a series of sections fitting together to form a conduit, each section being provided with a depression in the bottom opening beneath the section, and means for controlling flow of air through the opening.

8. In a pneumatic system for conveying material, a conduit, an exhaust fan at the discharge end thereof, the said conduit having a series of openings providing for a flow of air inwardly materially less than the capacity of the conduit, the said openings being provided in the lower side of the conduit to prevent deposition of the material therein, and a manually operable valve for controlling flow of air through each opening independently.

9. In a pneumatic system for conveying material, a conduit, an exhaust fan at the discharge end thereof, the said conduit having a series of openings providing for a flow of air thereinto materially less than the capacity of the conduit, the said openings being provided in the lower side of the conduit to prevent deposition of material therein, and means for controlling flow of air through the said openings.

10. In a pneumatic system for conveying material, a conduit of uniform diameter throughout, an exhaust fan at the discharge end thereof, the said conduit having a series of openings providing for a flow of air inwardly materially less than the capacity of the conduit, the said openings being provided in the lower side of the conduit to prevent deposition of material therein, and means for controlling flow of air through the said openings..

11. In a pneumatic conveyer, a conveyer conduit, an exhaust fan housing connected to the discharge end of the conveyer conduit and having a discharge opening, an exhaust fan in the housing adapted to withdraw material from the conveyer conduit and discharge it through the discharge opening, the said conveyer conduit having a series of angular depressions in the bottom, each depression being provided with an opening to atmosphere, each opening being provided in the portion of the depression at the greatest distance from the exhaust fan.

12. In a pneumatic conveyer, a conveyer conduit having a series of openings for branch conduits for the dischrage of material into the conveyer conduit, an exhaust fan housing connected to the discharge end of the conveyer conduit and having a discharge opening, an exhaust fan in the housing adapted to withdraw material from the conveyer conduit and discharge it through the discharge opening, the said conveyer conduit having a series of depressions in the bottom in the desired spaced relation longitudinally of the conduit, each depression having an opening to atmosphere through which air is adapted to flow inwardly in the direction of flow through the conduit.

In testimony whereof I sign this specification.

RUSSELL C. MAHON.

DISCLAIMER 1,641,181.—*Russell C. Mahon*, Detroit, Mich. PNEUMATIC CONVEYER. Patent dated September 6, 1927. Disclaimer filed September 19, 1932, by the assignee, *The R. C. Mahon Company.*

Hereby disclaims claims 11 and 12 of said patent.

[*Official Gazette October 18, 1932.*]